US007251380B2

(12) United States Patent
Zuev et al.

(10) Patent No.: US 7,251,380 B2
(45) Date of Patent: Jul. 31, 2007

(54) ADJUSTMENT METHOD OF A MACHINE-READABLE FORM MODEL AND A FILLED FORM SCANNED IMAGE THEREOF IN THE PRESENCE OF DISTORTION

(75) Inventors: Konstantin Zuev, Moscow (RU); Irina Filimonova, Moscow (RU)

(73) Assignee: ABBYY Software Ltd. (RU)

( * ) Notice: Subject to any disclaimer, the term of this patent is extended or adjusted under 35 U.S.C. 154(b) by 802 days.

(21) Appl. No.: 10/403,414

(22) Filed: Apr. 1, 2003

(65) Prior Publication Data

US 2005/0089248 A1   Apr. 28, 2005

(30) Foreign Application Priority Data

Jan. 28, 2003   (RU) .......................... 2003102203 A

(51) Int. Cl.
G06K 9/03    (2006.01)
G06K 9/32    (2006.01)
(52) U.S. Cl. ...................................... 382/309; 382/294
(58) Field of Classification Search ................ 382/159, 382/175–176, 181, 209, 224, 231, 309–310, 382/151, 294; 358/406, 504; 715/508
See application file for complete search history.

(56) References Cited

U.S. PATENT DOCUMENTS

| | | | |
|---|---|---|---|
| 4,633,507 A * | 12/1986 | Cannistra et al. ........... 382/175 |
| 5,305,396 A * | 4/1994 | Betts et al. .................. 382/175 |
| 5,416,849 A * | 5/1995 | Huang ......................... 382/173 |
| 5,563,403 A | 10/1996 | Bessho et al. ............ 250/208.1 |
| 5,796,410 A | 8/1998 | Baird .......................... 345/471 |
| 5,818,976 A | 10/1998 | Pasco et al. ................. 382/289 |
| 5,822,454 A * | 10/1998 | Rangarajan ................. 382/180 |
| 5,828,771 A | 10/1998 | Bloomberg ................. 382/112 |
| 6,014,470 A | 1/2000 | Matsuda ..................... 382/275 |
| 6,035,064 A | 3/2000 | Nakao et al. ................ 382/200 |
| 6,064,778 A | 5/2000 | Pasco et al. ................. 382/289 |
| 6,470,091 B2 | 10/2002 | Koga et al. .................. 382/101 |

* cited by examiner

Primary Examiner—Daniel Mariam
(74) Attorney, Agent, or Firm—Sergey Platonov

(57) ABSTRACT

An adjustment method of a machine-readable form model and a filled form scanned image thereof in the presence of distortion comprising model form free of distortion, image form, containing distortion, obtained by optical input device from paper media. One embodiment of the method comprises the steps of assigning of one of the forms as changeable, marking on the form regions containing distortion, computing the consolidated distortion correction factor of the spatial parameters for the said changeable form, parameters correction on the base of the said consolidated factor. Another embodiment of the method setting the correspondence between identical objects of image form and model form is followed by steps of computing distortion correction factors of the spatial parameters for each object of selected level, spatial parameters correction of the changeable form, on the base of the said factors, affecting objects of the same and lower identification reliability levels.

19 Claims, 3 Drawing Sheets

Employee questionnaire

Family name       Smith

First name         John

Middle name      Abracham

FIG. 1

Employee questionnaire

Family name       Smith

First name         John

Middle name      Abracham

FIG. 2 ed image.
ADJUSTMENT METHOD OF A MACHINE-READABLE FORM MODEL AND A FILLED FORM SCANNED IMAGE THEREOF IN THE PRESENCE OF DISTORTION

BACKGROUND OF THE INVENTION

1. Field of the Invention

The present invention relates generally to a field of bit-mapped image character recognition systems for machine readable forms and, more particularly, to a method of image pre-process assisting character and text recognition from a bit-mapped binary image or other binary or raster images inputted from a scanning device or the like, especially in the presence of distortion.

2. Prior Art

Segmentation and parsing methods are known in the art. Typically, such methods divide an image into homogeneous regions containing text or non-text objects and use a plurality of special computing procedures, each depending on a plurality of parameters, to analyze an object, detect and compensate distortion, if any appeared from external devices processing of the document.

According to the prior art the directions of text lines are used as guiding lines for horizontal direction estimation, supposing them to be horizontal.

A method and apparatus for detecting the skew angle of a document image is proposed in U.S. Pat. No. 5,563,403 Oct. 8, 1996 Bessho, et al. Skew angle determination is performed by the steps of determining a set of sampling points from an input document image and processing X and Y coordinates of the sampling points in order to calculate a regression coefficient of the sampling points. The skew angle of the document is determined using the regression coefficient. To evaluate a calculated skew angle which corresponds to the regression coefficient, a correlation coefficient is calculated and evaluated. Since coordinates of sampling points are obtained for a plurality of sets of data corresponding to different guiding lines or lines of characters, a histogram may be used to determine the most probable one.

The method can be used only with large text blocks and small values of skew.

A method and apparatus for document skew and size/shape detection is known from U.S. Pat. No. 5,818,976 Pasco, et al. Oct. 6, 1998 and U.S. Pat. No. 6,064,778 May 16, 2000 Pasco, et al. The invention relates in general to optical scanning and image processing, and relates more particularly to a document imaging system, which detects skew and/or detects size/shape of a document image. Preferred embodiments utilize a background with optical characteristics, which contrast with those of the scanned document. In one embodiment, a document imaging system generates scanning signals in response to optical characteristics of a medium such as a sheet of paper, detects transitions in the scanning signal which define points along one or more edges of the medium, establishes a skew angle between the detected edges and a reference orientation, and compensates for skew by modifying the scanning signals as required such that the resultant skew angle is substantially equal to zero. In another embodiment, a document imaging system detects one or more edges of a document, defines a polygon having sides substantially congruent with the detected edges, and establishes the size of the document in response to the polygon.

The invention can't be applied to the machine-readable forms, especially in the case of large skew and size/shape distortion.

A method for determining whether a scanned image is an original image or fax image is described in U.S. Pat. No. 5,828,771 Oct. 27, 1998, Bloomberg. An efficient image processing technique automatically analyzes an image scanned at 300 or greater dpi and measures an image characteristic of the input image from which it is possible to determine whether the image has ever been previously scanned or printed at low resolution at some time in its history. The technique is effective in classifying an image that was at one time embodied in paper form and scanned at a vertical resolution of 100 dpi or less, such as a facsimile document scanned in standard mode, or at 200 pixels/inch (referred to as "fine fax mode".) The technique performs measurements on the pixels included in the vertical or horizontal edges of symbols contained in the input image, and produces a distribution of the measurements. A numerical interpretation of the measurement distribution data is used to classify the image.

The invention may be applied to only a small percentage (e.g., 7%) of a document image as long as the subimage selected contains symbols such as characters.

An image reading apparatus having a function for rectifying an image distortion caused by a curvature of a document surface is described in U.S. Pat. No. 6,014,470 Jan. 11, 2000, Matsuda, wherein the image distortion is rectified by duplicating image data that is a line of pixels in accordance with a varied amount of heights of a document surface, and a data conversion that is a image processing procedure in which the number of bits for pixels is reduced, is executed for the rectified image data. The reducing a memory capacity needed for the distortion rectification can be achieved without lowering picture quality.

The method has a limited application since it could rectify only image distortions caused by curvature of the document surface.

A specialized address reading method and apparatus for recognizing a receiver address on a surface of mail is proposed in U.S. Pat. No. 6,470,091 Oct. 22, 2002 Koga, et al. An image of the surface of the mail is input and segmented into at least one character string candidate. At least one address area candidate is extracted from the image based upon the segmented character string candidate. One address area candidate extracted from the image is selected as a receiver address by analyzing each address area candidate based on predetermined position information indicating a usual position of a receiver address area, character direction information indicating a character direction of a character string appropriate for the predetermined position information, and key character string information indicating a character string most likely existing in a receiver address. Characters in character strings of the selected address area candidate are recognized as a receiver address.

The method supposes little or none distortion or skew of scanned image and bases on the single type model document—postage envelope.

All known methods could not be used to compensate distortion of a considerable value (more then 10% of the initial image size).

SUMMARY OF THE INVENTION

The main technical result of the invention lies in the increasing of distortion compensation ability of machine readable form images, appeared after external devices processing of document to convert it from bit-mapped image into paper medium or vice versa, widening compensation abilities for linear and non-linear distortion.

Said technical result is achieved by parsing the scanned image of a machine-readable form into regions containing images of input fields, reference points, lines, and other objects. Further all kinds of objects that may appear on the form are classified into a plurality of types differing by their identification reliability. After that all identified objects on the form are assigned identification reliability factors, depending on their types. Then the analysis is performed to check the correspondence of spatial factors and skew angles of objects to those of the model form that is distortion free.

One of the versions of the proposed method consists in computing the distortion factors on the base of each object on the form. Then for each group of objects within the same identification reliability level the consolidated correction factor for the objects' spatial factors is computed. The said consolidated correction factor is applied for objects of the same identification reliability level and lower. Then the same procedure is repeated with the objects which have an identification reliability level one step lower than the previous one.

According to another version of the proposed method the distortion factors are computed on the base of each object on the form. Then all the distortion factors along with the corresponding types of objects as a weight factors are consolidated into one generalized correction factor, further applied to coordinates and/or dimensions and/or geometric shape of each object to compensate distortion.

BRIEF DESCRIPTION OF THE DRAWINGS

FIG. 1. Form layout sample.

FIG. 2. Form layout sample with marked out connected regions.

DETAILED DESCRIPTION OF THE INVENTION

Figure 3:
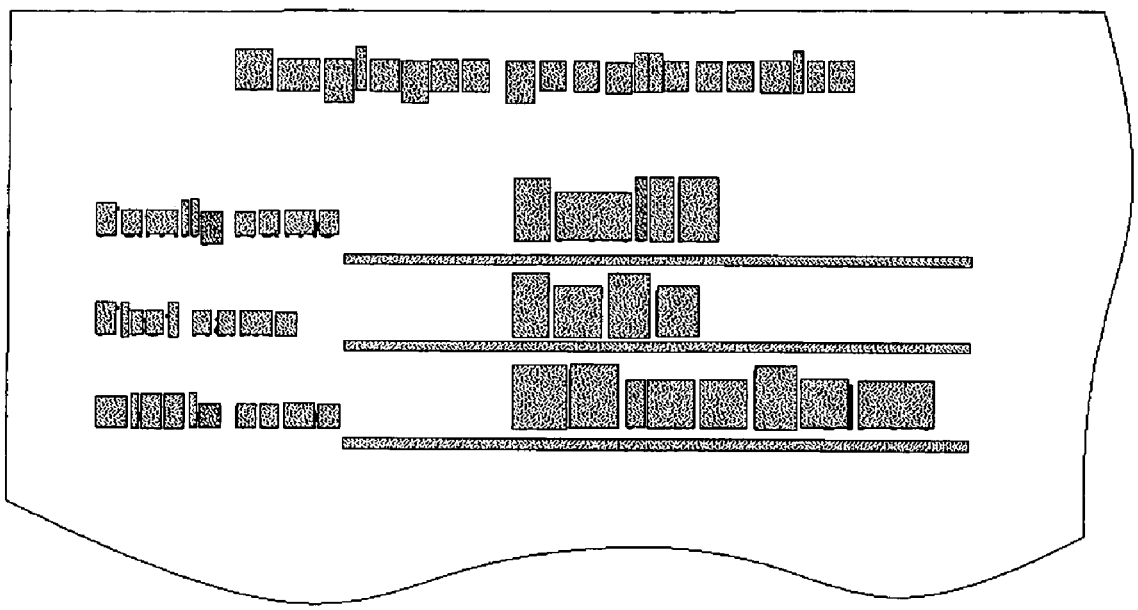
FIG. 3. Image representation as a set of rectangles.

The necessary additional explanations to the proposed method are as follows.

For the confident distortion compensation, especially non-linear as well as considerable linear, it is important to dispose in the system data of the form model free of distortion.

Form Model.

A data about the recognized form should in any way be present in the system. Form description is specified by the model. The model comprises the description of all objects of the form. For each object is thus specified:

object coordinates on the form and its geometric shape, field name—field name is usually associated with the type of input data as well as the destination of recognition results, recognition parameters, as text type (handwritten, printed), allowable value range, list of dictionaries for field context control.

Fields coordinates in the model may not coincide with those in the scanned bit-mapped image due to distortion appeared from the form printing or scanning.

Types of Distortion.

On printing of empty forms on the external devices (as printer or in a printing house) the following kinds of image distortion may appear:

small horizontal or vertical displacements, small horizontal or vertical stretchings/compressions, small skew angles.

On scanning the paper forms the more substantial kinds of distortion may appear:

horizontal or vertical displacements, large skew angles, scanner horizontal resolution alteration, scanner vertical resolution alteration—depends upon reading unit movement velocity, that may vary even for the same scanner, depending on warming-up extent or AC voltage level etc., small non-linear vertical stretching/compression—the scanning velocity may vary within one sheet of paper.

All kinds of distortion can be modeled by affinal transformation.

A problem of marking out fields on the form image thus comes to that of selecting the inverse affine transformation.

Model and Image Matching Method.

To match a form model with a form image it is necessary to select affine transformation factors, being applied to the model of form or to the image of form makes the identical fields in both forms coincide.

The most consecutive and suitable (proving itself) for problems concerning signals processing is the method based on a correlation function calculation:

$$(x, y, \ldots) = \text{argmax } R_{TI}(x, y, \ldots)$$

where $R_{TI}(x, y, \ldots)$ is a correlation function between the image (I) and model (T)

$$R_{TI}(x, y, \ldots) = \int_{x,y,\ldots} \ldots T(x,y,\ldots) I(x-x, y-y, \ldots) dx\, dy\, d\ldots$$

A direct computation of the correlation function for the image requires a considerable computing amount—$n^{2m}$, где n—image size in pixels (1000–2000), m=5—a number of parameters (horizontal or vertical displacements, skew angle, horizontal or vertical stretch or compression).

To reduce the computation amount the said method is applied separately to the different parameter groups. It is permissible since the examined parameter range is rather narrow, and thus a presence of false maximum on the correlation function projection to the selected parameter group is unlikely. Therefore, the calculation can be provided on the different distortion types in the following way:

displacements computation, skew angle computation, horizontal stretch/compression coefficient computation, vertical stretch/compression coefficient computation.

The displacement computation can't be divided into independent horizontal and vertical, since due to the nearly periodical line structure of the image, false maximums can appear on the projection of correlation function.

The further optimization is based on adequate image representation.

Image Representation.

In the most image segmentation systems of printed documents is customary to change to the image representation as a list of rectangles, corresponding to connected regions of the image, that is usually letters and dividing lines. This kind of representation turns out to be sufficient approximation for the proper work of segmentation algorithms.

The basis of the present invention is the method of a correlation function computation for an image represented as a list of connected regions.

A similar representation should be done for the form model.

An optimization of the correlation function for an image representation as a list of rectangles.

An image represented as a list of rectangles, could be interpreted as several images superposition, each containing one rectangle from the list:

$I = \Sigma I_k$ — where $I_k$ is an image of one rectangle.

In the like manner for the model:

$T = \Sigma T_k$ — where $T_k$ is an image of one rectangle.

At that the fact that the rectangles can overlap is disregarded.

Then the correlation function $R_{TI}$ can be analyzed in the following way:

$$R_{TI} = \int_{x,y} T(x,y) I(x-x, y-y) dx dy =$$

$$\int_{x,y} \sum_i T_i(x,y) \sum_k I_k(x-x, y-y) dx dy =$$

$$\sum_{ik} \int_{x,y} T_i(x,y) I_k(x-x, y-y) dx dy$$

i.e. as a sum of correlation functions of single rectangles.

But the rectangle image can be represented as a product of Heaviside functions:

$$I_k(x,y) = \theta(x-x_{1k}) \theta(x_{2k}-x) \theta(y-y_{1k}) \theta(y_{2k}-y)$$

where $x_{1k}, x_{2k}, y_{1k}, y_{2k}$ — the rectangle coordinates $$I_k(x,y) = \theta(x-x_{1k}) \theta(x_{2k}-x) \theta(y-y_{1k}) \theta(y_{2k}-y) =$$

$$\int_{x,y} (\delta(x-x_{1k}) \delta(y-y_{1k}) - \delta(x_{2k}-x) \delta(y-y_{1k}) -$$

$$\delta(x_{2k}-x) \delta(y-y_{1k}) + \delta(x_{2k}-x) \delta(y_{2k}-y)) dx dy$$

where $\delta(x-x_{jk})$ — a delta-function on the rectangle border.

In the like manner for the $T_i(x,y)$:

$$T_i(x,y) = \theta(x-x_{1i}) \theta(x_{2i}-x) \theta(y-y_{1i}) \theta(y_{2i}-y) ==$$

$$\int_{x,y} (\delta(x-x_{1i}) \delta(y-y_{1i}) - \delta(x_{2i}-x) \delta(y-y_{1i}) -$$

$$\delta(x_{2i}-x) \delta(y-y_{1i}) + \delta(x_{2i}-x) \delta(y_{2i}-y)) dx dy$$

Then the correlation function of two rectangles can be calculated as follows:

$$\int_{x,y} T_i(x,y) I_k(x-x, y-y) dx dy = \int\int_{x,y} F_{ik}(x,y) dx dy$$

$$F_{ik}(x,y) = [\delta(x-(x_{2i}-x_{1k})) -$$

$$\delta(x-(x_{2i}-x_{2k})) - \delta(x-(x_{1i}-x_{1k})) + \delta(x-(x_{1i}-x_{2k}))]$$

-continued $$[\delta(y-(y_{2i}-y_{1k})) - (\delta(y-(y_{2i}-y_{2k})) -$$

$$\delta(y-(y_{1i}-y_{1k})) + \delta(y-(y_{1i}-y_{2k}))]$$

The correlation function of an image and a model appears via $F_{ik}(x,y)$ as follows:

$$R_{TI} = \sum_{ik} \int_{x,y} T_i(x,y) I_k(x-x, y-y) dx dy =$$

$$\sum_{ik} \int\int_{x,y} F_{ik}(x,y) dx dy = \int\int_{x,y} \sum_{ik} F_{ik}(x,y) dx dy$$

Switching to the discrete representation the $\Sigma_{ik} F_{ik}(x,y)$ is a two dimensional histogram filled in using the following algorithm:

For each pair of rectangles of the image and the model:

To add "1" to the histogram in the following points:

$(x_{2i} - x_{1k}, y_{2i} - y_{1k})$ $(x_{1i} - x_{2k}, y_{2i} - y_{1k})$ $(x_{2i} - x_{2k}, y_{2i} - y_{2k})$ $(x_{1i} - x_{1k}, y_{2i} - y_{2k})$ $(x_{2i} - x_{2k}, y_{1i} - y_{1k})$ $(x_{1i} - x_{1k}, y_{1i} - y_{1k})$ $(x_{2i} - x_{1k}, y_{1i} - y_{2k})$ $(x_{1i} - x_{2k}, y_{1i} - y_{2k})$

To add "−1" to the histogram in the following points:

$(x_{2i} - x_{2k}, y_{2i} - y_{1k})$ $(x_{1i} - x_{1k}, y_{2i} - y_{1k})$ $(x_{2i} - x_{1k}, y_{2i} - y_{2k})$ $(x_{1i} - x_{2k}, y_{2i} - y_{2k})$ $(x_{2i} - x_{1k}, y_{1i} - y_{1k})$ $(x_{1i} - x_{2k}, y_{1i} - y_{1k})$ $(x_{1i} - x_{1k}, y_{1i} - y_{2k})$ $(x_{2i} - x_{2k}, y_{1i} - y_{2k})$

After the two dimensional histogram integration the sought correlation function is obtained. The integration is performed only once, but not for each parameter of correlation function, so the calculation amount is reduced greatly.

A supplementary stage, summarizing the two dimensional histogram, though appears to be quadratic, works fast, since the amount of rectangles is greatly less then the amount of pixels.

The method is described for the case of displacement function. The computation of the other factors of linear transformations is performed similarly.

For the one- or two-dimension local non-linear distortion compensation a method is used that consist in marking regions on the image subjected to non-linear distortion with the further processing of said regions separately from the rest image by means, applied for the linear distortion. In addition the region size is selected greater then the distorted part.

Figure 4:
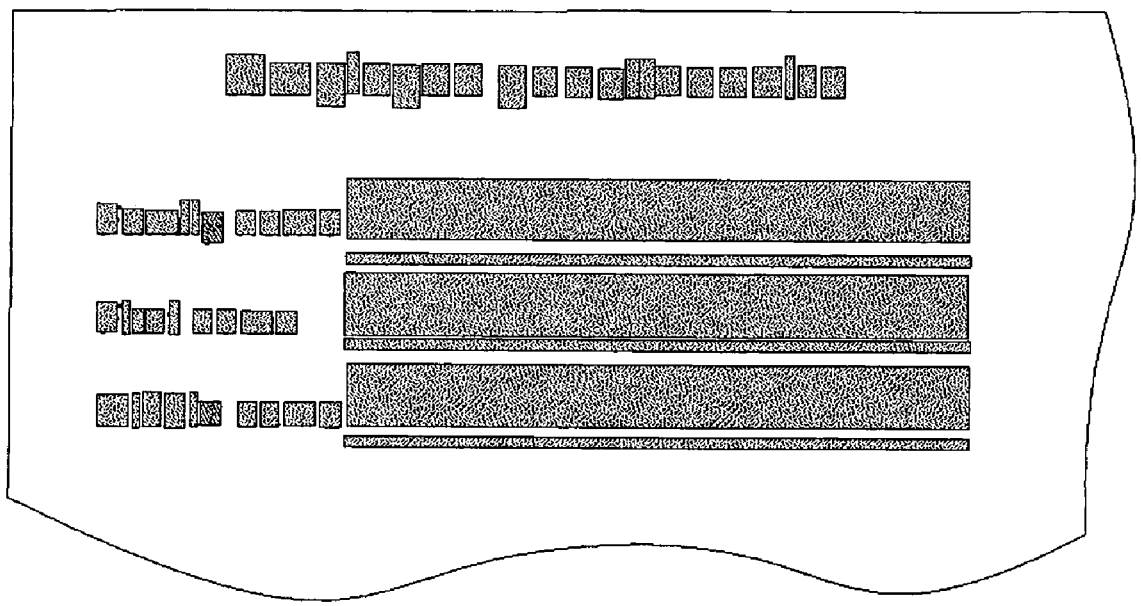
FIG. 4. Model representation as a set of rectangles.
Figure 5:
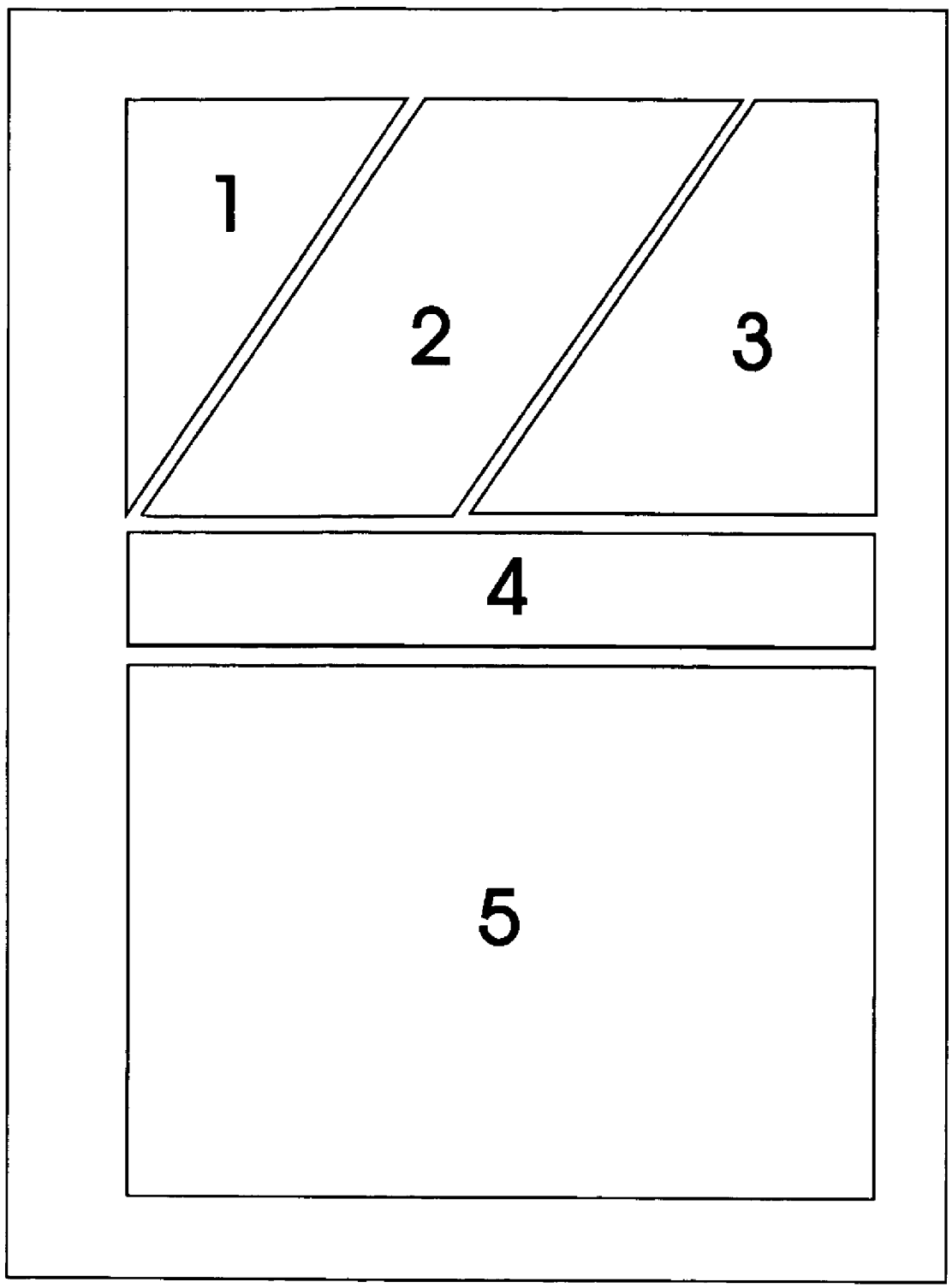
FIG. 5. Marking out of regions in an image containing distortion.

The essence of the proposed method is illustrated by FIG. 1–5.

Two embodiments are proposed.

According to the first one, the following set of steps must be done.

One of the two forms—either image form or model form—is assigned as changeable—to be subjected to changes for distortion compensation. At the same time the other one is assigned as non-changeable—to be not subjected to changes for distortion compensation.

The scanned machine-readable form, containing distortion, is parsed into set of non-overlapped regions, the said regions being larger then the distortion expansion, the distortion within the region could be processed as a linear distortion. In the case of not significant non-linear distortion the image is parsed into the only region of the entire image size.

After that, all possible set of objects that can be met on the form, is divided into several types differing in reliability level of identification on the form and the extent of distortion influence of the spatial parameters.

The scanned objects are identified.

Each object is assigned identification reliability level in accordance with its type.

In each selected region and for each objects type, starting from most reliably identified, decreasing the level one after another to the lowest one, to perform the following steps:
 setting the conformity between the identical objects of image form and model form,
 computing the correction factors to compensate objects' spatial parameters of the selected level,
 correcting the spatial parameters of the form, assigned as changeable, taking into account computed the correction factors, affecting only the objects of the selected level and lower.

Performing the subsequent form image processing.

According to the second embodiment the following steps are to be made.
 computing of the partial correction factors for spatial parameters of the form, assigned as changeable, for each object on the form,
 calculating of the consolidated correction factor of spatial parameters of the form, assigned as changeable, on the base of partial correction factors calculated for each object along with their identification reliability levels as weight factors,
 correction of spatial parameters of form, assigned a changeable, on the base of said consolidated correction factor.

Performing the subsequent form image processing. Typically this is the text recognition in the input fields of the form.

Either the model form or the image form can be assigned as a changeable form.

Any step of the method can comprise supplemental objects comparison quality estimation.

Spatial orientation of the image can be estimated and corrected to normal if necessary.

Proposed method can comprise compliance confirmation of the image form and model form.

It can either comprise multiple model compliance confirmation image form per one pass.

The distortion can be compensated along one or two axes.

Additionally, non-linear distortion, linear distortion, image displacement, image warp, image skew angle can be compensated by the proposed method.

Small turn angles are processed as displacements.

The subsequent form image processing typically comprises at least the text recognition in the input fields of the form.

We claim:

1. An adjustment method of a machine-readable form model and a filled form scanned image thereof in the presence of distortion, comprising the steps of:
 constructing the form model in electronic form describing spatial correlation and parametrical properties of the form objects free of distortion;
 receiving a filled form image in electronic form obtained by means of optical input from a paper medium;
 said form model comprising at least
  reference points spatial characteristics information,
  data input fields' spatial or parametrical characteristics information;
 representing said received form image in the form of bit-mapped image, comprising at least
  reference points images,
  data input fields images,
  inputted data images into the input fields,
  distortion, caused by an external devices, on form transferring from electronic into paper form or vice versa;
 said method further comprising the following steps:
  assigning either form of image or form of model as changeable form, that would be subjected to changes, with the simultaneous assignment of the other said form as non-changeable, not subjected to changes,
  marking out on the non-changeable form one or more non-overlapped regions, covering the areas with distortion, the size of the said region to be greater than the covered area with distortion,
  marking on the changeable form regions corresponding to those on the non-changeable form,
  dividing of all variety of objects, that can be present on the form, into several types differing in reliability level of identification,
  assigning each object image, present on the form of image, a reliability level of identification in accordance with its type,
  for each selected region, and for each type of object, beginning from the highest level of identification reliability, step by step decreasing the said level to the lowest one, performing the following steps:
   setting the correspondence between identical objects of image form and model form,
   computing distortion correction factors of the spatial parameters for each object of selected level, present on the changeable form,
   spatial parameters correction of the changeable form, on the base of the said factors, affecting objects of the same identification reliability level and lower;
  performing the subsequent form image processing, wherein the subsequent form image processing comprises at least text recognition in the input fields of the form.

2. An adjustment method of a machine-readable form model and a filled form scanned image thereof in the presence of distortion, comprising the steps of:

constructing the form model in electronic form describing spatial correlation and parametrical properties of the form objects free of distortion;

receiving a filled form image in electronic form obtained by means of optical input from a paper medium;

said form of model comprising at least reference points spatial characteristics information, data input fields' spatial or parametrical characteristics information, representing said received form image in the form of bit-mapped image, comprising at least reference points images, data input fields images, inputted data images into the input fields, distortion, caused by an external devices, on form transferring from electronic into paper form or vice versa;

said method further comprising the following steps:

assigning either form of image or form of model as changeable form, that would be subjected to changes, with the simultaneous assignment of the other said form as non-changeable, not subjected to changes, marking out on the non-changeable form one or more non-overlapped regions, covering the areas with distortion, the size of the said region to be greater than the covered area with distortion, marking on the changeable form regions corresponding to those on the non-changeable form, dividing of all possible set of objects, that can be met on the form, into several types differing in reliability level of identification, assigning each object image, present on the form of image, a reliability level of identification in accordance with its type, for each selected region, and for each type of object, beginning from the highest level of identification reliability, step by step decreasing the said level to the lowest one, performing the following steps:

setting the correspondence between identical objects of image form and model form, computing a partial distortion correction factors of the spatial parameters for each object present on the changeable form, computing a consolidated distortion correction factor of the spatial parameters, on the base of said partial distortion correction factors for each object, taking into account their identification reliability levels, spatial parameters correction for objects of changeable form, taking into account said consolidated factor;

performing the subsequent form image processing, wherein the subsequent form image processing comprises at least text recognition in the input fields of the form.

3. Method as recited in claims 1 or 2, wherein said model form is assigned as a changeable form and the received image form is assigned as a non-changeable form.

4. Method as recited in claims 1 or 2, wherein said received image form is assigned as a changeable form and the model form is assigned as a non-changeable form.

5. Method as recited in claims 1 or 2, further comprising supplemental objects comparison quality estimation.

6. Method as recited in claims 1 or 2, wherein a spatial orientation of the received image form is estimated.

7. Method as recited in claim 6, wherein the spatial orientation of the received image form is corrected to normal if necessary.

8. Method as recited in claims 1 or 2, further comprising compliance confirmation of the received image form and the model form.

9. Method as recited in claim 8, further comprising multiple model compliance confirmation of the received image form per one pass.

10. Method as recited in claims 1 or 2, wherein the distortion is compensated along one axis.

11. Method as recited in claims 1 or 2, wherein the distortion is compensated along two axes.

12. Method as recited in claims 1 or 2, wherein a linear distortion is compensated.

13. Method as recited in claims 1 or 2, wherein a non-linear distortion is compensated.

14. Method as recited in claims 1 or 2, wherein a small non-linear distortion is compensated as linear distortion.

15. Method as recited in claims 1 or 2, wherein an image displacement is compensated.

16. Method as recited in claims 1 or 2, wherein an image warp is compensated.

17. Method as recited in claims 1 or 2, wherein an image scale is compensated.

18. Method as recited in claims 1 or 2, wherein an image skew angle is compensated.

19. Method as recited in claim 18, wherein small turn angles are processed as displacements.

* * * * *